United States Patent
Moncino et al.

(10) Patent No.: US 10,146,049 B2
(45) Date of Patent: Dec. 4, 2018

(54) COLD WEATHER CAMERA KIT

(71) Applicant: FLIR SYSTEMS, INC., Wilsonville, OR (US)

(72) Inventors: Kai Moncino, Santa Barbara, CA (US); John H. Distelzweig, Santa Barbara, CA (US); Norman A. Hannotte, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 15/468,596

(22) Filed: Mar. 24, 2017

(65) Prior Publication Data

US 2017/0285335 A1     Oct. 5, 2017

Related U.S. Application Data (60) Provisional application No. 62/317,363, filed on Apr. 1, 2016.

(51) Int. Cl.
    *G02B 27/00*       (2006.01)
    *G02B 7/02*        (2006.01)
    *G03B 17/55*       (2006.01)

(52) U.S. Cl.
    CPC ......... *G02B 27/0006* (2013.01); *G02B 7/028* (2013.01); *G02B 27/00* (2013.01); *G03B 17/55* (2013.01)

(58) Field of Classification Search
    CPC .... G02B 27/00; G02B 27/0006; G02B 7/028; G03B 17/55; H04N 5/2252

USPC .......................................................... 359/820
See application file for complete search history.

(56) References Cited

U.S. PATENT DOCUMENTS

| | | | | |
|---|---|---|---|---|
| 2,470,455 | A * | 5/1949 | Avila | G03B 7/22 359/822 |
| 4,169,727 | A | 10/1979 | Morgan | |
| 5,194,985 | A | 3/1993 | Hilton, Sr. | |
| 9,402,017 | B2 * | 7/2016 | Umehara | H04M 1/0264 |
| 9,454,003 | B1 * | 9/2016 | Li | G02B 27/0006 |
| 9,876,992 | B2 * | 1/2018 | Imamura | H04N 7/181 |
| 2011/0249120 | A1 * | 10/2011 | Bingle | B60R 11/04 348/148 |
| 2012/0170119 | A1 * | 7/2012 | Chu | G03B 17/55 359/512 |
| 2012/0243093 | A1 * | 9/2012 | Tonar | H01L 41/0973 359/507 |
| 2013/0113926 | A1 * | 5/2013 | Chen | B64D 15/20 348/135 |
| 2014/0340516 | A1 * | 11/2014 | Vojtisek | B60R 1/00 348/148 |
| 2016/0272164 | A1 * | 9/2016 | Hsiao | B60S 1/0862 |

(Continued)

*Primary Examiner* — William R Alexander
(74) *Attorney, Agent, or Firm* — Haynes and Boone, LLP (57) ABSTRACT

Various embodiments of the present disclosure may include an imaging system that includes a de-icing assembly. The de-icing assembly may include a de-icing window and a window frame. The de-icing window may be constructed from Float Zone Silicon, single crystal sapphire, and/or germanium. The de-icing assembly may be coupled to a lens barrel of a camera. Heat generated by a heater element of the camera may be conducted via the housing and the lens barrel of the camera to the de-icing assembly. The heated de-icing assembly may prevent the formation of ice on the de-icing window by conducting heat to the de-icing window.

20 Claims, 5 Drawing Sheets

(56) References Cited

U.S. PATENT DOCUMENTS

2018/0017785 A1* 1/2018 Bulgajewski ...... G02B 27/0006
2018/0131879 A1* 5/2018 Nagata .................... G01J 5/061
2018/0176431 A1* 6/2018 Kim .......................... B60R 1/08

* cited by examiner

COLD WEATHER CAMERA KIT

CROSS-REFERENCE TO RELATED APPLICATIONS

This application claims the benefit of and priority to U.S. Provisional Patent Application No. 62/317,363 filed Apr. 1, 2016 and entitled "COLD WEATHER CAMERA KIT," which is incorporated herein by reference in its entirety.

TECHNICAL FIELD

One or more embodiments of the invention relate generally to imaging devices and more particularly to, for example, imaging devices configured for cold weather.

BACKGROUND

In cold environments, ice build-up on lenses of imaging devices may be problematic. As components of the imaging devices, such as the lenses, are exposed to the cold and drop in temperature, moisture within the air may condense on such components. Certain lenses may have poor thermal conduction properties and so heating devices for such lenses may be inefficient and/or poorly functioning. As a result, there is a need for a cost effective solution to preventing ice build-up on such lenses.

SUMMARY

Systems and methods are disclosed herein for providing an imaging system with a de-icing assembly. In certain embodiments, an apparatus may be provided. The apparatus may include a lens barrel, a camera lens disposed within the lens barrel, a de-icing assembly including a window frame and a de-icing window coupled to the window frame, where the window frame is coupled to the lens barrel and the de-icing window is thermally conductively coupled to the lens barrel and a heater element thermally conductively coupled to the lens barrel.

In certain other embodiments, another apparatus may be provided. The apparatus may include a window frame including a substantially cylindrical window body, where the window body includes a first end and a second end and at least the second end is configured to be coupled to a lens barrel and a de-icing window at least partially disposed within the window frame, where the de-icing window is configured to be thermally conductively coupled to the lens barrel when the window frame is coupled to the lens barrel.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Techniques and mechanisms are provided in accordance with one or more embodiments to de-ice or prevent icing of one or more lenses of an imaging system. Certain embodiments may include a de-icing assembly configured to be installed on the imaging system. The de-icing assembly may include a de-icing window, a window frame, and a gasket. The imaging system may include a lens barrel and a camera lens. When installed, the de-icing window may be thermally conductively coupled to the lens barrel (e.g., there may be a conductive thermal circuit formed by, at least, the de-icing window and the lens barrel). The lens barrel may be heated and the heat may thus be conducted from the lens barrel to the de-icing window. Accordingly, the lens barrel may conduct heat to the de-icing window to de-ice or prevent the formation of ice on the de-icing window.

Figure 1:
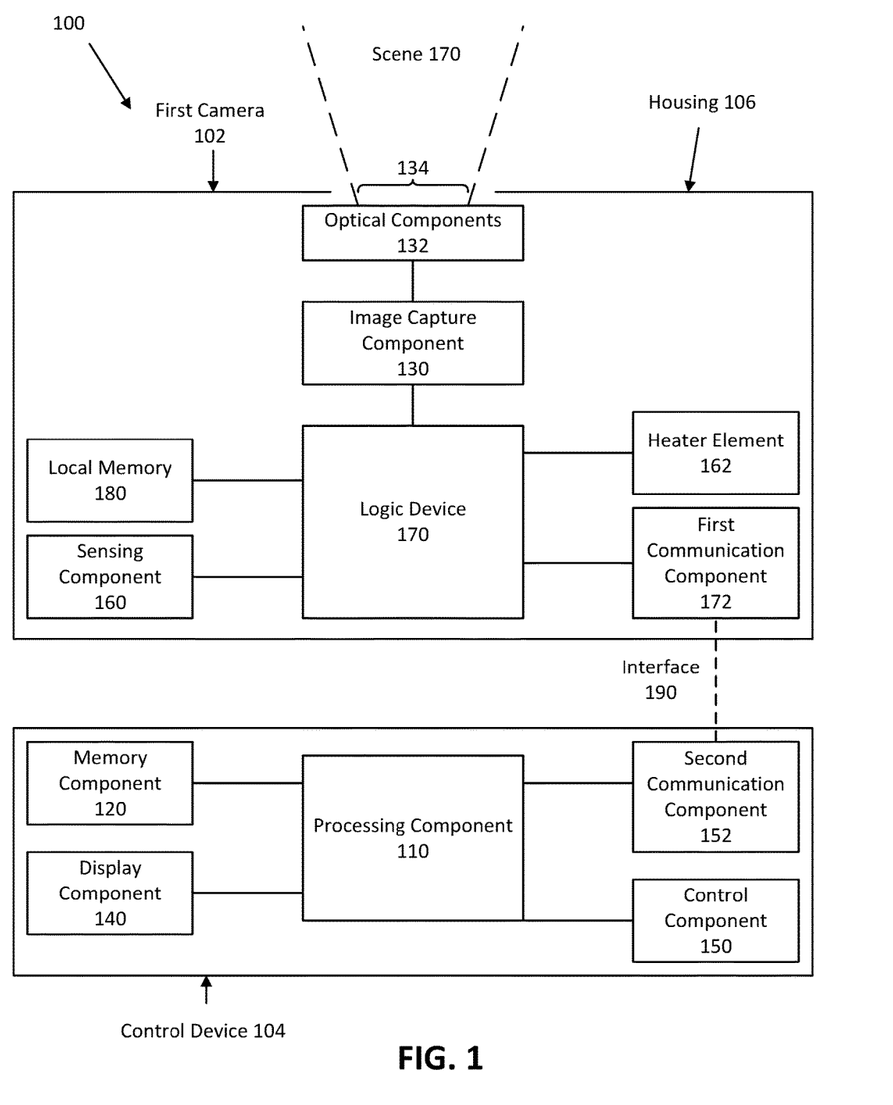
FIG. 1 illustrates a block diagram of an imaging system in accordance with an embodiment of the disclosure.

FIG. 1 illustrates a block diagram of an imaging system in accordance with an embodiment of the disclosure. Imaging system 100 in FIG. 1 may be used to capture and process image frames in accordance with various techniques described herein.

Imaging system 100 includes a first camera 102 and a control device 104 in communication with the first camera 102. In certain embodiments, components of the imaging system 100, such as the first camera 102 and the control device 104, may be distributed over one or multiple devices. Some such embodiments may distribute one, some, or all of the components of imaging system 100 over the cloud. Thus, in those embodiments, image processing may be performed over the cloud, using one or multiple cloud devices, by sending image data over the cloud. Once the image has been processed, the image may be displayed or stored via an internet service (such as on YouTube®, Dropbox®, Google Drive®, etc.) or sent back to a user device and displayed or stored on the user device. In various embodiments, either the first camera 102 and/or the control device 104 may be a camera, a camera suite, a sensor suite, a smartphone, a computer, a server, a tablet, or another type of electronic device.

In certain embodiments, the first camera 102 and the control device 104 may be coupled together. That is, the first camera 102 may be a camera attachment that may be fitted or communicatively connected (e.g., via Bluetooth) to the control device 104. The control device 104 may run an application that performs at least a portion of an image processing procedure. In such an embodiment, the control device 104 may be a smartphone, a tablet, a computer, or another type of electronic device that may receive the camera attachment. In certain embodiments, the camera attachment may be fitted via connectors such as USB or Lightning Cable connectors. Other embodiments may connect the first camera 102 and the control device 104 through a network connection, such as via Bluetooth, the internet, Near Field Communications ("NFC"), Local Area Network ("LAN"), or other network connections.

In one embodiment, the first camera 102 includes a logic device 170, a local memory 180, an image capture component 130, optical components 132, a first communication component 172, a sensing component 160, and a heater element 162. The control device 104 may include a processing component 110, a memory component 120, a display component 140, a second communication component 152, and a control component 150.

In various embodiments, the first camera 102 may be implemented as an imaging device, such as a camera, to capture image frames of, for example, a scene 170 (e.g., a field of view). The first camera 102 may represent any type of camera which, for example, detects electromagnetic radiation (e.g., irradiance) and provides representative data (e.g., one or more still image frames or video image frames). For example, the first camera 102 may represent a camera that is directed to detect one or more ranges (e.g., wavebands) of electromagnetic radiation and provide associated image data. Imaging system 100 may include a portable device and may be implemented, for example, as a handheld device and/or coupled, in other examples, to various types of vehicles (e.g., a land-based vehicle, a watercraft, an aircraft, a spacecraft, or other vehicle) or to various types of fixed locations (e.g., a home security mount, a campsite or outdoors mount, or other location) via one or more types of mounts. In still another example, the first camera 102 may be integrated as part of a non-mobile installation to provide image frames to be stored and/or displayed.

The logic device 170 and/or the processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or or any other appropriate combination of processing device and/or memory to execute instructions to perform any of the various operations described herein. The logic device 170 may be adapted to interface and communicate with components 130, 160, 162, 172, and 180 to perform method and processing steps as described herein. The processing component 110 may be adapted to interface and communicate with components 120, 140, 150, and 152.

Additionally, the logic device 170 may be adapted to receive image signals from image capture component 130, process image signals (e.g., to provide processed image data), store image signals or image data in local memory 180, and/or retrieve stored image signals from local memory 180. Certain embodiments of the first camera 102 may include a plurality of image capture components. Such embodiments may capture multiple scenes and the logic device 170 and/or the processing component 110 may then create a composite image out of the multiple scenes captured by the plurality of image capture components. The logic device 170 may also communicate data, via the first communication component 172, to the control device 104. The first communication component 172 may communicate with the control device 104 via an interface 190 established between the first communication component 172 and the second communication component 152 of the control device 104. In various embodiments, the interface 190 may be a Bluetooth link, a WiFi link, a NFC link, a wired connection, or another type of link between the first camera 102 and the control device 104.

The local memory 180 and/or the memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 and/or the logic device 170 is adapted to execute software stored in the memory component 120 and/or the local memory 180, respectively, to perform various methods, processes, and modes of operations in manner as described herein.

Image capture component 130 includes, in one embodiment, one or more sensors (e.g., any type of visible light, infrared, or other type of detector, including a detector implemented as part of a focal plane array or as a single detector) for capturing image signals representative of an image, of scene 170. In one embodiment, the sensors of image capture component 130 (e.g., an infrared sensor) provide for representing (e.g., converting) a captured thermal or radiometric image signal of scene 170 as digital data (e.g., via an analog-to-digital converter included as part of the sensor or separate from the sensor as part of imaging system 100). The image capture component 130 may capture high dynamic range radiometric thermal images or videos. The image capture component 130 may be, for example, a bolometer based imaging apparatus (e.g., the image capture component 130 may be an array of sensors).

Optical components 132 may include one or more lenses configured to receive electromagnetic radiation through an aperture 134 in housing 106 and pass the electromagnetic radiation to image capture component 130. Additionally, optical components 132 may include one or more filters (e.g., warm filters, bandpass filters, low pass filters, high pass filters, notch filters, and/or other optical filters) to filter electromagnetic radiation before the radiation reaches the image capture component 130. In certain other embodiments, alternatively or in addition to filters located in front of the electromagnetic radiation, processing component 110 may be configured to filter images captured by the image capture component 130 with, for example, software within processing component 110. In certain other embodiments, the optical filters (e.g., warm filters, bandpass filters, low pass filters, high pass filters, notch filters, and/or other optical filters) may be integrated within the image capture component 130. For embodiments where the image capture component 130 is an array, the optical filters may be integrated within each sensor of the array and/or integrated as one or more optical filters covering a plurality of sensors.

The logic device 170 and/or the processing component 110 (via the interface 190) may be adapted to receive image signals from the image capture component 130, process image signals (e.g., to provide processed image data), store image signals or image data in the local memory 180 and/or the memory component 120, and/or retrieve stored image signals from the respective memories. Image data, either high dynamic range image data or low dynamic range image data, may be transferred between the first camera 102 and the control device 104 via the interface 190. In certain embodiments, the image data transferred may be compressed image data. Processing component 110 may be adapted to process image signals received to provide image data (e.g., reconstructed image data) to the display component 140 for viewing by a user.

Display component 140 includes, in one embodiment, an image display device (e.g., a liquid crystal display (LCD)) or various other types of generally known video displays or monitors. Processing component 110 may be adapted to display image data and information on display component 140 that the processing component 110 retrieved from the memory component 120, processed from image data received via the interface 190, or processed from any other source. Display component 140 may include display electronics, which may be utilized by processing component 110 to display image data and information. Display component 140 may receive image data and information directly from image capture component 130 via the interface 190, from the logic device 170 via the interface 190, or the image data and information may be transferred from memory component 120.

In various aspects, display component 140 may be remotely positioned (e.g., housed in a separate housing) from the image capture component 130, and processing component 110 may be adapted to remotely display image data and information on display component 140 via wired or wireless communication with display component 140, as described herein.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Processing component 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, it should be appreciated that the control panel unit may be adapted to include one or more other user-activated mechanisms to provide various other control operations of imaging system 100, such as auto-focus, menu enable and selection, field of view (FoV), brightness, contrast, gain, offset, spatial, temporal, and/or various other features and/or parameters. In other embodiments, a variable gain signal may be adjusted by the user or operator based on a selected mode of operation.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a smart phone, a tablet, a personal digital assistant (e.g., a wireless, mobile device), a laptop computer, a desktop computer, or other type of device.

In certain embodiments, the first camera 102 may include the control component 150 and/or the display component 140 instead of or in addition to the control device 104. It is appreciated that the various components described herein may be included on either or both of the first camera 102 and the control device 104.

Sensing component 160 includes, in one embodiment, one or more sensors to detect environmental conditions and/or operating conditions of the imaging system 100. For example, the sensing component 160 may include one or more environmental sensors that may detect temperature, humidity, air pressure, lighting conditions, and/or other conditions of the environment around one or more components of the imaging system 100. Alternatively or additionally, the sensing component 160 may include sensors that may, for example, detect moisture and/or the formation of ice on components of the imaging system 100 or components coupled to the imaging system 100.

Processing component 110 and/or logic device 170 may be adapted to communicate with sensing component 160 (e.g., by receiving sensor information from sensing component 160) and image capture component 130 (e.g., by receiving data and information from image capture component 130 and providing and/or receiving command, control, and/or other information to or from other components of imaging system 100). In certain embodiments, a component may communicate with another component via the interface 190.

In various embodiments, sensing component 160 may be adapted to provide data and information relating to system applications including a handheld implementation and/or coupling implementation associated with various types of vehicles (e.g., a land-based vehicle, a watercraft, an aircraft, a spacecraft, or other vehicle) or stationary applications (e.g., a fixed location, such as on a structure). In one embodiment, sensing component 160 may include communication devices that relay information to processing component 110 via wireless communication. For example, sensing component 160 may be adapted to receive and/or provide information through a satellite, through a local broadcast transmission (e.g., radio frequency), through a mobile or cellular network and/or through information beacons in an infrastructure (e.g., a transportation or highway information beacon infrastructure) or various other wired or wireless techniques (e.g., using various local area or wide area wireless standards).

In another embodiment, imaging system 100 may include one or more other types of sensing components 160, including environmental and/or operational sensors, depending on the sensed application or implementation, which provide information to processing component 110 (e.g., by receiving sensor information from each sensing component 160). In various embodiments, other sensing components 160 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130. The other sensing components 160 may be located on the first camera 102, as shown in FIG. 1, on the control device 104, on both the first camera 102 and the control device 104, or, alternatively or additionally, on another device separate from the first camera 102 and the control device 104.

In some embodiments, other sensing components 162 may include devices that relay information to processing component 110 via wireless communication. For example, each sensing component 162 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

The heater element 162 may be, for example, an electronic heater configured to heat the housing 106, the image capture component 130, and/or another portion of the first camera 102 and/or the control device 104. In certain embodiments, the heater element 162 may heat at least a portion of a lens barrel of the housing 106. The heater element 162 may be attached to the lens barrel and/or may be positioned so that heat generated by the heater element 162 may be conducted to the lens barrel. The lens barrel may include one or more of the optical components 132. The lens barrel may be configured to receive a de-icing system that may be installed to prevent formation of ice on the optical components 132.

In various embodiments, components of imaging system 100 may be combined and/or implemented or not, as desired or depending on application requirements, with imaging system 100 representing various operational blocks of a system. For example, processing component 110 may be combined with memory component 120, image capture component 130, display component 140, and/or sensing component 160. In another example, processing component 110 may be combined with image capture component 130 with only certain operations of processing component 110 performed by circuitry (e.g., a processor, a microprocessor, a microcontroller, a logic device, or other circuitry) within image capture component 130. In still another example, control component 150 may be combined with one or more other components or be remotely connected to at least one other component, such as processing component 110, via a wired or wireless control device so as to provide control signals thereto.

In one embodiment, second communication component 152 and/or first communication component 172 may be implemented as a network interface component (NIC) adapted for communication with a network including other devices in the network. In various embodiments, second communication component 152 and/or first communication component 172 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, second communication component 152 and/or first communication component 172 may include an antenna coupled thereto for wireless communication purposes. In other embodiments, the second communication component 152 and/or first communication component 172 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network. The first communication component 172 may send radiometric thermal images or video over the interface 190 to the second communication component 152.

Figure 2:
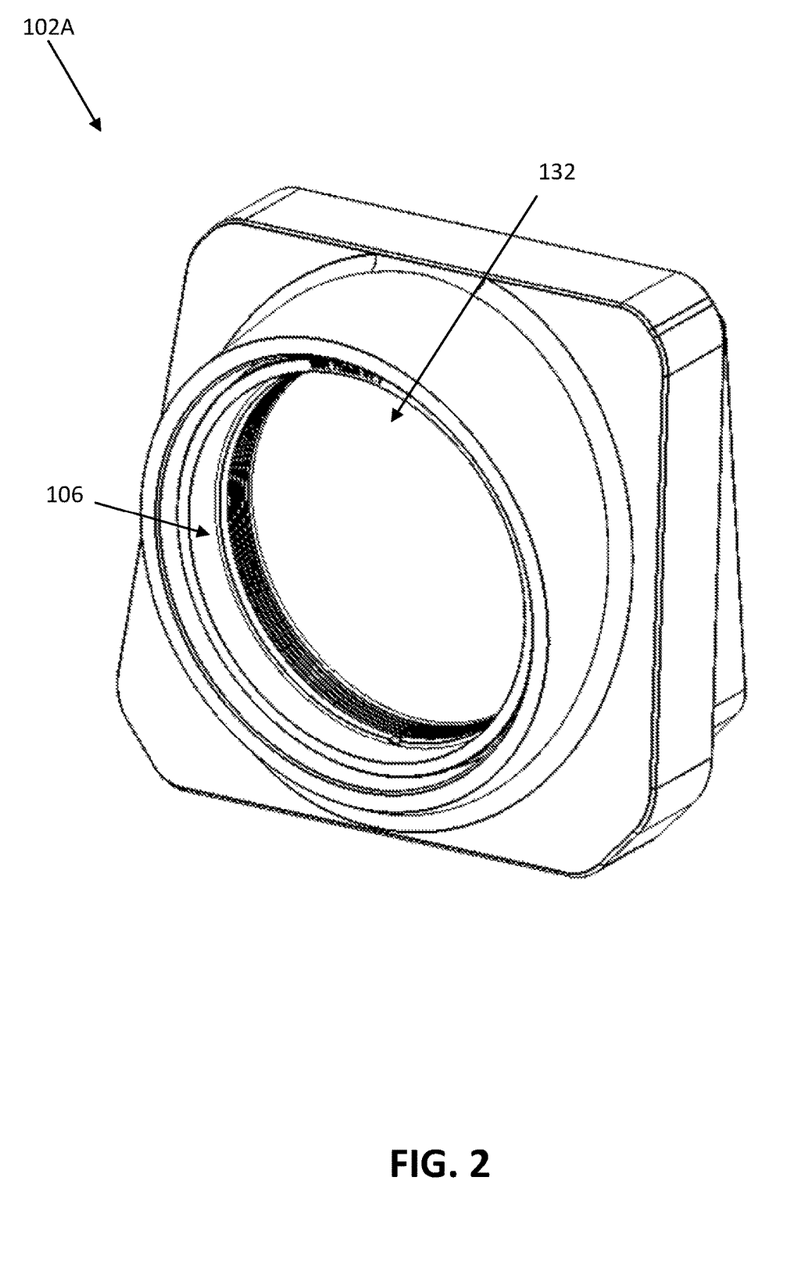
FIG. 2 illustrates a camera in accordance with an embodiment of the disclosure.

FIG. 2 illustrates a camera in accordance with an embodiment of the disclosure. FIG. 2 illustrates a camera 102A that includes an optical component 132 and a housing 106. The optical component 132 may similar to such optical components described in FIG. 1. The optical component 132 may be one or more lenses. The one or more lenses may be any appropriate lens material such as glass, germanium, quartz glass, fluorite, plastic, meteoritic glass, and/or Chalcogenide. In certain embodiments, the one or more lenses may be relatively poor heat conductors (e.g., may be made from material(s) with thermal conductivity of less than 1 W/m*deg).

The housing 106 may enclose an outer perimeter of the optical component 132. As such, the optical component 132 may be set within the housing 106. In certain embodiments, the optical components 132 may be set within a lens barrel of the housing 106. The lens barrel may, for example, house the optical component 132 as well as allow for adjustment of positioning of the optical component 132 within the housing 106 by, for example, telescoping the lens barrel and/or the positioning of the optical component 132. In certain embodiments, the housing 106 may include additional components, such as the heater element 162 as well as other components.

Figure 3:
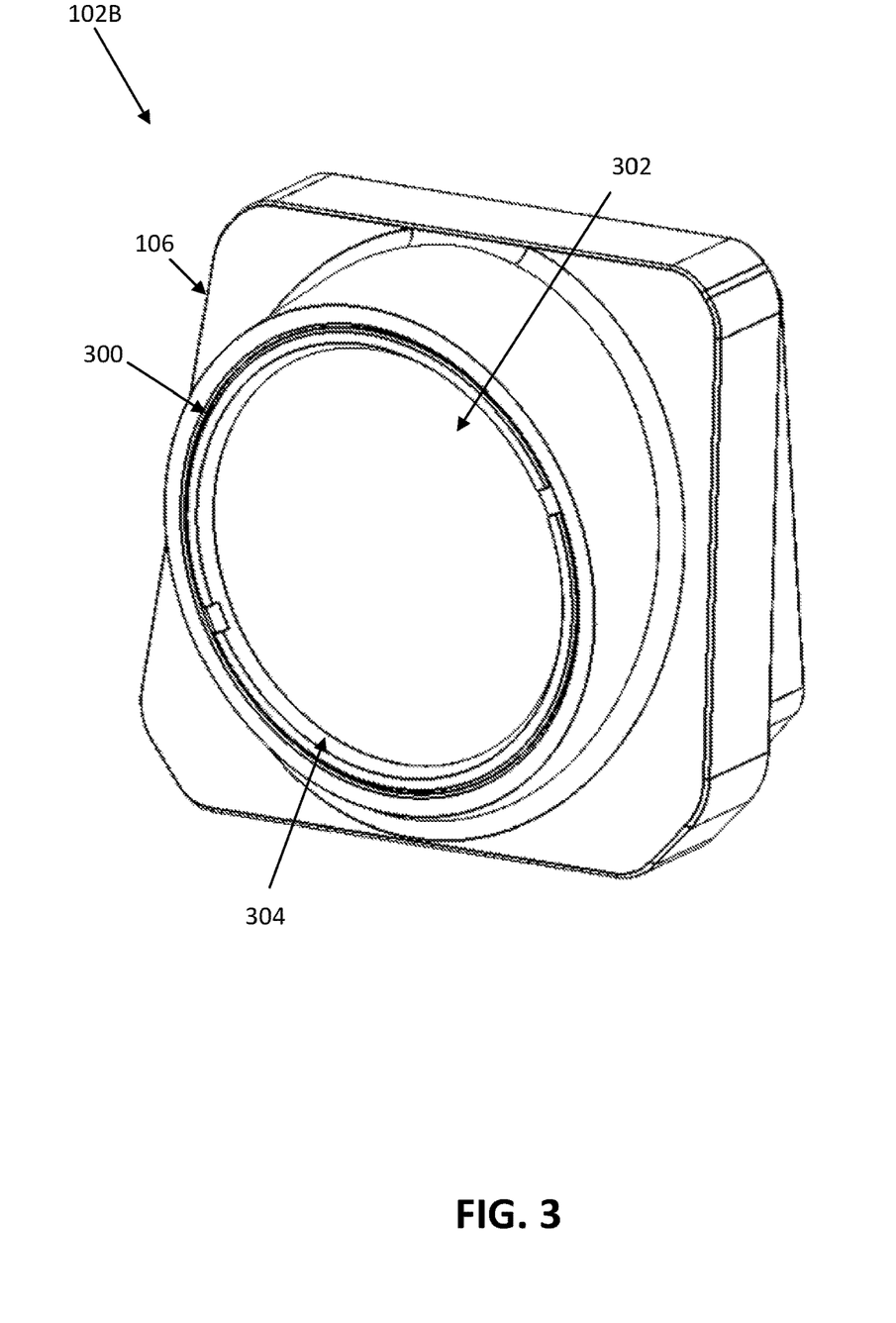
FIG. 3 illustrates a camera with an installed de-icing system in accordance with an embodiment of the disclosure.

FIG. 3 illustrates a camera with an installed de-icing system in accordance with an embodiment of the disclosure. FIG. 3 illustrates a camera 102B with a housing 106 and a de-icing assembly 300. The de-icing assembly 300 may include, at least, a de-icing window 302 and a window frame 304.

The de-icing window 302 may, in certain embodiments, be thermally conductively coupled to the lens barrel of the housing 106. The de-icing window 302 may include a material that is a relatively good heat conductor (e.g., may be made from a material(s) with thermal conductivity of more than 25 W/m*K) such as Float Zone Silicon, single crystal sapphire, and/or germanium. In certain applications, Float Zone Silicon may be used as a material for the de-icing window 302 due to thermal conductivity, cost, durability, optical, and/or other reasons. Certain embodiments of the de-icing window 302 may be transparent in certain electromagnetic wavelengths, such as visual, infrared, and/or other wavelengths.

The de-icing window 302 may be coupled to the window frame 304. In certain embodiments, the de-icing window 302 may be press-fit, bonded, screwed into, glued, attached via fasteners, and/or coupled to the window frame 304. The window frame 304 may, in certain embodiments, be configured to couple to the lens barrel of the housing 106. The window frame 304 may be coupled to the lens barrel by, for example, threading onto a portion of the lens barrel (e.g., the lens barrel and the window frame 304 may each include corresponding threaded portions), via snap fitting (e.g., through hooks or formed snaps), through adhesives, through fasteners (e.g., a screw or multiple screws may hold the window frame 304 to the lens barrel), through alignment of features on the lens barrel and the window frame 304, and/or through other such techniques. In various embodiments, the window frame 304 may be constructed as a one-piece window frame or may be constructed from a plurality of pieces. The window frame 304 may be configured to be coupled and decoupled from the housing 106. In certain such embodiments, the coupling and/or decoupling may be performed without tools or may be performed with simple hand tool such as a screwdriver. As such, the de-icing assembly 300 may be easily installed and removed and so may be installed only when, for example, ice formation may be possible due to conditions.

In certain embodiments, after the de-icing assembly 300 has been coupled to the lens barrel, the de-icing window 302 may be in direct contact with the lens barrel. In other embodiments, the de-icing window 302 may be thermally conductively coupled to the lens barrel via the window frame 304. In such embodiments, the window frame 304 may also include a material that is a relatively good heat conductor.

In certain embodiments, the de-icing window 302 may be a flat window. A flat window may allow for even distribution of any ice build-up on the de-icing window 302. Even distribution of ice build-up may allow for quicker de-icing as all areas of the de-icing window 302 may be melted within approximately the same time period due to the even thickness of the ice build-up. As such, a flat window avoids having thicker concentrations of ice. Additionally, the de-icing window 302 may include one or a plurality of de-icing windows. Embodiments including a plurality of de-icing windows may allow for superior insulation of the optical component 132 from the environment and thus may decrease the possibility of ice formation on the optical component 132 even more.

The camera 102B shown in FIG. 3 may be, in certain embodiments, the camera 102A of FIG. 2 with the de-icing assembly 300 installed. When installed, the de-icing assembly 300 may seal a volume between the de-icing assembly 300 and the optical component 132. Sealing may be accomplished with, for example, a gasket, such as the gasket 306 described in FIG. 4. Sealing the volume between the de-icing assembly 300 and the optical component 132 may prevent formation of ice on the optical component 302. For example, moisture from the outside environment may be sealed out, and the volume may also be heated due to heating of the de-icing window 302, the lens barrel of the housing 106, and/or other components of the camera 102B and as such the internal temperature of the volume may be sufficiently high to prevent formation of ice.

Figure 4:
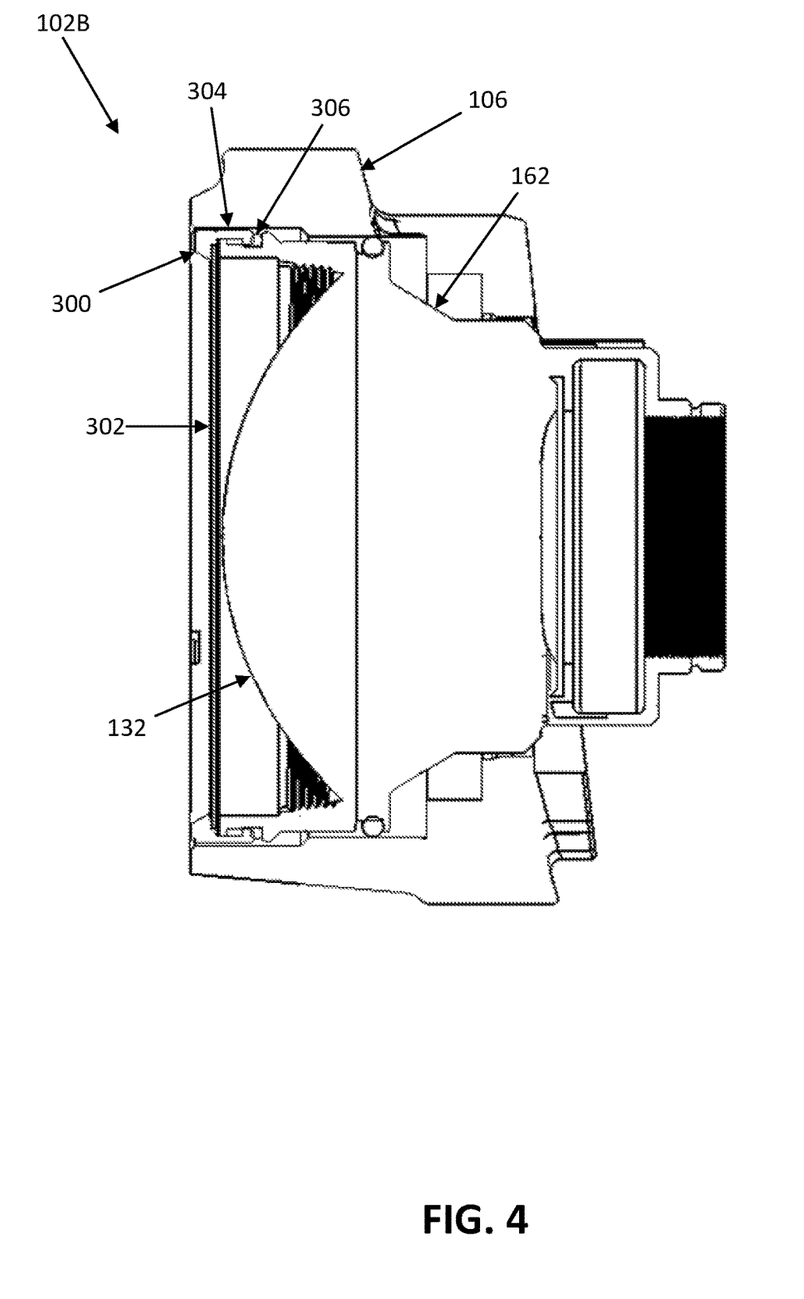
FIG. 4 illustrates a cutaway view of a camera with an installed de-icing system in accordance with an embodiment of the disclosure.

FIG. 4 illustrates a cutaway view of a camera with an installed de-icing system in accordance with an embodiment of the disclosure. FIG. 4 shows a cutaway view of the camera 102B. The de-icing assembly 300, the housing 106, the optical component 132 are shown in FIG. 4. Additionally, FIG. 4 shows the gasket 306 and a heater element 162.

In certain embodiments, the lens barrel may be heated by the heater element 162. The heater element 162 may be, for example, an electrical heater such as a strip heater. In certain such embodiments, the heater element 162 may be disposed within the housing 106, such as within the lens barrel of the housing 106. The strip heater may be attached to a portion of the lens barrel. In certain embodiments, the heater element 162 may be coupled to a portion or the entire perimeter of a section of the lens barrel. In embodiments where the heater element 162 is positioned around a portion of the section of the lens barrel, portions of the heater element 162 may be arranged in an evenly spaced manner. As such, the heater element 162 may be positioned to evenly heat the lens barrel and, thus, allow for even conduction of heat to the de-icing assembly 300.

In the embodiment shown in FIG. 4, the de-icing assembly 300 may be installed via snaps. Other embodiments may install the de-icing assembly via other techniques. In the embodiment shown in FIG. 4, the de-icing window 302 may be coupled to the window frame 304. The window frame 304 may be inserted into the lens barrel and may contact the lens barrel. Heat from the lens barrel may be conductively transferred from the lens barrel to the de-icing window 302 via the window frame 304, though other embodiments may conductively transfer heat from the lens barrel directly to the de-icing window 302.

The gasket 306 may also be installed between the lens barrel of the housing 106 and the window frame 304 and/or the de-icing window 302. The gasket 306 may seal the volume between the de-icing assembly 300, the lens barrel, and the optical component 302 to prevent formation of ice on the optical component 302. In certain embodiments, the lens barrel may include features such as a raised lip for the gasket 306 to be installed on as well as features such as threads or receiving features for snaps to couple the de-icing assembly 300 to the lens barrel. In certain embodiments, the gasket 306 may be inserted within the lens barrel first and then the de-icing assembly 300 may be installed. The gasket 306 may be compressed by the de-icing assembly 300 to seal the volume between the de-icing window 302 and the optical component 132.

Figure 5:
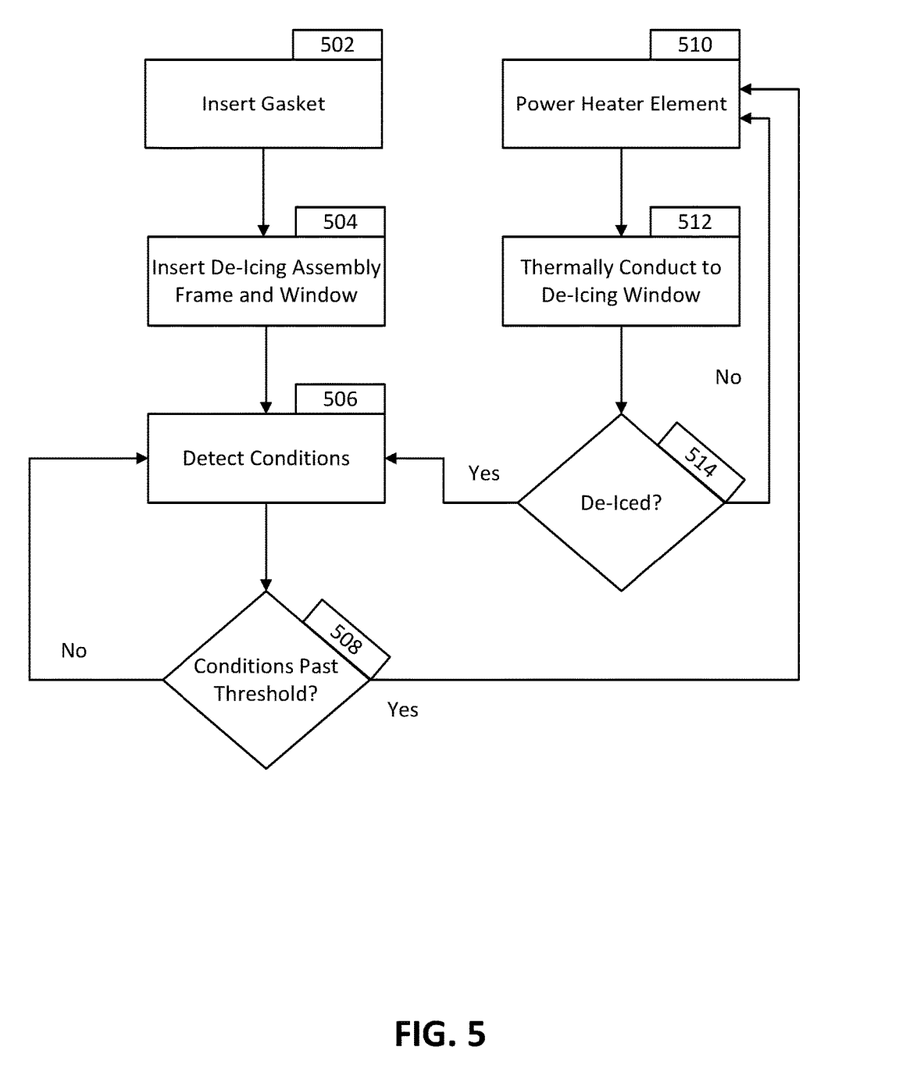
FIG. 5 illustrates a flowchart of a process of assembling an imaging system with a de-icing system and operating the de-icing system in accordance with an embodiment of the disclosure.

FIG. 5 illustrates a flowchart of a process of assembling an imaging system with a de-icing system and operating the de-icing system in accordance with an embodiment of the disclosure. The process described in FIG. 5 may be performed with an imaging system, such as the imaging system 100 using the cameras and components described in FIGS. 1-4.

In block 502, the gasket 306 may be inserted into the lens barrel (e.g., inserted into an opening of the lens barrel that may contain the optical components 132). In certain embodiments, the lens barrel may include features holding the gasket 306 in place.

In block 504, the de-icing assembly 300 may be inserted into the lens barrel and coupled to the lens barrel. As such, the de-icing assembly 300 may be, for example, threaded onto the lens barrel, snapped into the lens barrel, glued or otherwise bonded, attached via fasteners (e.g., screws), or attached to the lens barrel through another such technique. In certain embodiments, attaching the de-icing assembly 300 may compress the gasket 306 to seal the volume between the de-icing window 302 and the optical component 132.

In block 506, the sensing component 160 may detect conditions of the imaging system 100 and/or the environment around the imaging system 100. For example, the sensing component 160 may detect formation of ice on the optical component 132 of the camera 102, may detect environment conditions such as ambient temperature, humidity, air pressure, wind speed, ambient lighting conditions, and other such conditions, and/or may detect a surface temperature of a component of the imaging system 100 such as the de-icing window 302, the lens barrel or another portion of the housing 106, the optical component 132, and/or another component of the imaging system 100. The sensing component 160 may output data associated with such conditions to the logic device 170 and/or the processing component 110. Certain embodiments may detect multiple conditions.

In block 508, the conditions detected may be compared to one or more thresholds to determine whether the thresholds have been surpassed. For example, if the sensing component 160 is configured to detect an ambient and/or surface temperature, the temperature detected may be compared to determine whether the temperature detected is below a threshold temperature (e.g., a threshold temperature of between 32-40 degrees Fahrenheit). In certain embodiments, the threshold may be changed depending on other detected ambient conditions such as air pressure, wind speed, and/or lighting conditions. Additionally, if the sensing component 160 is configured to detect ice build-up, the threshold may be the detection of ice and/or the detection of a threshold amount of ice.

If the threshold has not been detected to be surpassed, the process may revert back to block 506 and continue to detect conditions. If the threshold has been detected to be surpassed, the process may continue to block 510. In block 510, power may be provided to the heater element 162. The heater element 162 may then generate heat.

In block 512, the heat generated by the heater element 162 may be conducted to the de-icing window. In certain embodiments, heat generated by the heater element 162 may be conducted to the housing 106 or a portion thereof and then conducted to the de-icing window 302. In certain embodiments, the heat may be conducted to the de-icing window 302 via the window frame 304 and/or via other components. The de-icing window 302 may then be heated and formation of ice on the de-icing window 302 as well as the optical component 132 may be mitigated and/or prevented.

In optional block 514, de-icing of the de-icing window 302 and/or the optical component 132 may be confirmed by, for example, certain sensors of the sensing component 160. In certain such embodiments, if the de-icing window 302 and/or the optical component 132 are detected to be free of ice, the imaging system 100 may return to detecting conditions in block 506. Other embodiments may power the heater element 510 for a set period of time. In certain embodiments, the heater element 162 may be powered off upon confirmation that the de-icing process has been completed. If de-icing has not been confirmed, the process may return to block 510.

In certain embodiments, if the conditions for powering the heater element 162 have been detected, the heater element 162 may continue to be powered until, for example, the imaging system 100 has been powered off. In other embodiments, there may be manual controls for a user to power the heater element 162 and thus de-ice the de-icing window. In additional embodiments, the heater element 162 may be continuously powered on. Such embodiments may include components (such as a sensor or a connection where, if the de-icing assembly 300 is coupled to the camera 102, an electrical connection is formed) that may determine when the de-icing assembly 300 has been coupled to the camera 102 and may, upon such determination, power the heater element 162 accordingly.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, the imaging system 100 may be associated with a particular network link such as for example a URL (Uniform Resource Locator), an IP (Internet Protocol) address, and/or a mobile phone number.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An apparatus comprising:
   a lens barrel;
   a camera lens disposed within the lens barrel;
   a de-icing assembly comprising a window frame and a de-icing window coupled to the window frame, wherein the de-icing window is directly thermally conductively coupled to the window frame and the window frame is directly thermally conductively coupled to the lens barrel; and
   a heater element thermally conductively coupled to the lens barrel.

2. The apparatus of claim 1, wherein the de-icing assembly is configured to be decoupled from the lens barrel.

3. The apparatus of claim 1, wherein the window frame comprises a substantially cylindrical window body, the window body comprises a window frame threaded portion, and the lens barrel comprises a lens barrel threaded portion configured to receive the window frame threaded portion.

4. The apparatus of claim 1, further comprising a sealed volume defined, at least in part, by the lens barrel, the camera lens, and the de-icing assembly and a gasket disposed, at least in part, between the lens barrel and the de-icing assembly, wherein the gasket is configured to seal the sealed volume.

5. The apparatus of claim 1, further comprising a power source coupled to the heater element and configured to power the heater element.

6. The apparatus of claim 5, further comprising a non-transitory memory and a processor, wherein the processor is configured to read instructions from the non-transitory memory to perform operations comprising:
   detect a temperature of the de-icing window and/or an environment around the de-icing window;
   determine whether the temperature is below a threshold temperature; and
   provide, responsive to determining that the temperature is below a threshold temperature, instructions to power the heater element with the power source.

7. The apparatus of claim 6, further comprising an environmental temperature sensor configured to detect a temperature of the environment and provide temperature data to the processor, wherein the processor is configured to, at least in part, detect the temperature of the environment from the temperature data.

8. The apparatus of claim 6, further comprising a window temperature sensor configured to detect a temperature of the de-icing window and provide temperature data to the processor, wherein the processor is configured to, at least in part, detect the temperature of the de-icing window from the temperature data.

9. The apparatus of claim 5, further comprising a non-transitory memory and a processor, wherein the processor is configured to read instructions from the non-transitory memory to perform operations comprising:
 detect formation of ice on the de-icing window; and
 provide, responsive to detecting formation of ice, instructions to power the heater element with the power source.

10. The apparatus of claim 9, further comprising an ice detection sensor configured to detect formation of ice on the de-icing window and provide, responsive to detecting formation of ice, data to the processor indicating formation of ice on the de-icing window, wherein the processor is configured to, at least in part, detect formation of the ice from the data.

11. The apparatus of claim 1, wherein the heater element is coupled to an interior of the lens barrel.

12. The apparatus of claim 1, wherein the camera lens comprises a first material and the de-icing window comprises a second material different from the first material.

13. The apparatus of claim 12, wherein the second material is float zone silicon, sapphire, and/or germanium and the first material is Chalcogenide.

14. The apparatus of claim 1, further comprising an imager configured to receive image data of at least a scene and output image data associated with the scene, wherein the imager is configured to receive image data in an infrared wavelength.

15. An apparatus comprising:
 a window frame comprising a substantially cylindrical window body, wherein the window body comprises a first end and a second end and at least the second end is configured to be coupled to a lens barrel; and
 a de-icing window at least partially disposed within the window frame, wherein the de-icing window is configured to be directly thermally conductively coupled to the window frame and the window frame is configured to be directly thermally conductively coupled to the lens barrel.

16. The apparatus of claim 15, wherein at least the second end of the window body comprises a threaded portion configured to be threaded onto a portion of the lens barrel.

17. The apparatus of claim 15, wherein the de-icing window comprises a first material and the window frame comprises a second material.

18. The apparatus of claim 17, wherein the first material is float zone silicon, sapphire, and/or germanium.

19. The apparatus of claim 17, wherein the second material is a plastic and/or a metal.

20. A method of installing the apparatus of claim 15 comprising:
 inserting a gasket, at least in part, within a lens barrel;
 thermally conductively coupling the de-icing window to the lens barrel;
 coupling the window frame to the de-icing window;
 coupling the window frame to the lens barrel; and
 sealing a volume with, at least, the gasket.

* * * * *

UNITED STATES PATENT AND TRADEMARK OFFICE
CERTIFICATE OF CORRECTION

PATENT NO. : 10,146,049 B2
APPLICATION NO. : 15/468596
DATED : December 4, 2018
INVENTOR(S) : Kai Moncino, John H. Distelzweig and Norman A. Hannotte Page 1 of 1

It is certified that error appears in the above-identified patent and that said Letters Patent is hereby corrected as shown below:

In the Specification

In the Detailed Description:

In Column 2, Line 64 change "USE" to --USB--.

Signed and Sealed this
Twenty-sixth Day of February, 2019

Andrei Iancu
*Director of the United States Patent and Trademark Office*